United States Patent [19]

Mikkor

[11] Patent Number: 4,625,561
[45] Date of Patent: Dec. 2, 1986

[54] SILICON CAPACITIVE PRESSURE SENSOR AND METHOD OF MAKING

[75] Inventor: Mati Mikkor, Ann Arbor, Mich.

[73] Assignee: Ford Motor Company, Dearborn, Mich.

[21] Appl. No.: 678,902

[22] Filed: Dec. 6, 1984

[51] Int. Cl.⁴ .......................... G01L 9/12; H01G 5/16
[52] U.S. Cl. ...................................... 73/724; 29/25.41; 29/454; 148/1.5; 361/283
[58] Field of Search ................. 73/724, 718; 361/283; 29/25.41, 454, 25.42; 148/1.5

[56] References Cited

U.S. PATENT DOCUMENTS

| | | | |
|---|---|---|---|
| 3,956,024 | 5/1976 | Cline et al. | 148/1.5 |
| 4,177,496 | 12/1979 | Bell et al. | 361/283 |
| 4,184,189 | 1/1980 | Davis et al. | 361/283 |
| 4,190,467 | 2/1980 | Lien | 148/1.5 |
| 4,207,604 | 6/1980 | Bell | 361/283 |
| 4,261,086 | 4/1981 | Giachino et al. | 29/25.41 |
| 4,345,299 | 8/1982 | Ho | 361/283 |
| 4,386,453 | 6/1983 | Giachino et al. | 29/25.41 |
| 4,390,925 | 6/1983 | Freud | 361/283 |
| 4,415,948 | 11/1983 | Grantham et al. | 361/283 |
| 4,420,790 | 12/1983 | Golke et al. | 361/283 |
| 4,424,713 | 1/1984 | Kroninger, Jr. et al. | 73/718 |
| 4,467,394 | 8/1984 | Grantham et al. | 73/718 |
| 4,495,820 | 1/1985 | Shimada et al. | 73/724 |

Primary Examiner—Donald O. Woodiel
Attorney, Agent, or Firm—Peter Abolins; Robert D. Sanborn

[57] ABSTRACT

A capacitive pressure sensor uses two silicon wafers hermetically sealed to each other by recrystallized silicon formed by the migration of a ring of silicon-aluminum eutectic material from the wafer interface to the surface of one wafer. Within the ring of the eutectic a cavity with opposing conductive plates forms a capacitor. Another high conductivity path through the wafer can be formed simultaneously with the ring of eutectic material by placing an aluminum dot on the interior side of one silicon wafer. Thus, a high conductivity path is available through a silicon wafer for each of the two capacitor plates.

17 Claims, 12 Drawing Figures

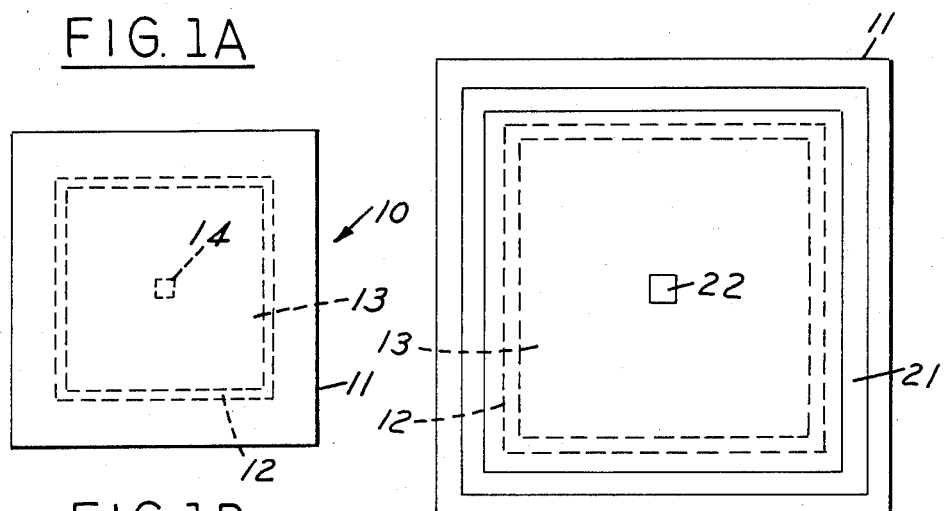
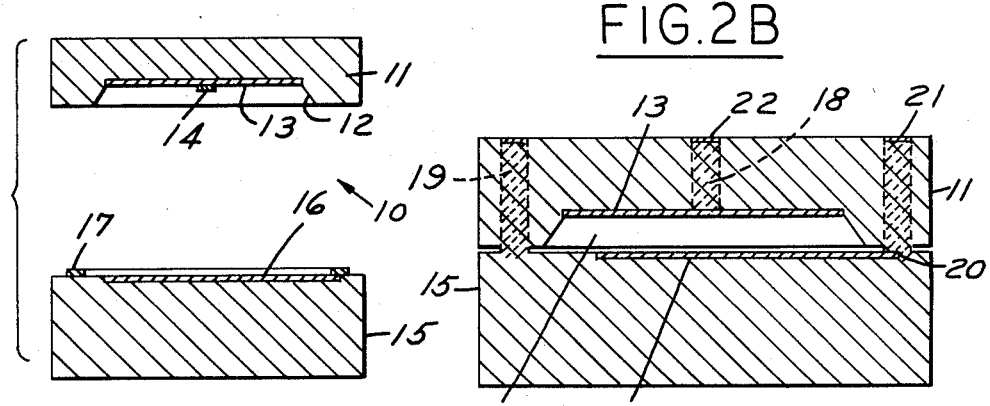
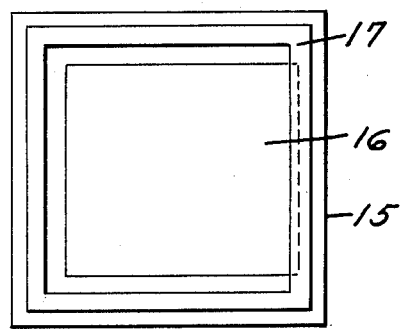
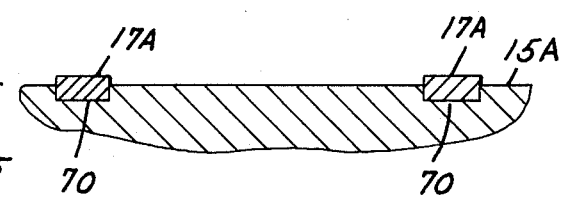

SILICON CAPACITIVE PRESSURE SENSOR AND METHOD OF MAKING

BACKGROUND OF THE INVENTION

1. Field of the Invention

This invention relates to a method for manufacturing variable capacitance pressure transducers and to the structure of the pressure transducer.

2. Prior Art

U.S. Pat. No. 4,415,948 teaches bonding of two highly doped silicon wafers, one with an etched cavity, together by using an intermediary glass coating deposited on one wafer. The other wafer is sealed to the coated wafer by electrostatic bonding.

U.S. Pat. No. 4,420,790 teaches forming a cavity by putting silicon spacers between two silicon plates that are covered with passivation layers of silicon dioxide and by a combination of silicon dioxide and silicon nitride layers. These layers electrically isolate the capacitor electrodes. The sensor cavity is not hermetically sealed but is open to the ambient. The two silicon plates are joined together by solder bumps and the spacing between the plates is kept constant by the spacers.

U.S. Pat. No. 4,424,713 teaches making a sensor structure including plates of glass, silicon and glass. The silicon is sealed to the glass by electrostatic bonding. The silicon plate has cavities on both sides, the cavity on one side being bigger than on the other side in order to provide stress relief on the silicon diaphragm.

U.S. Pat. No. 4,390,925 teaches making a sensor with multiple interconnected cavities in a silicon plate bonded electrostatically to a glass plate. Such a structure is taught to be a high pressure sensor.

U.S. Pat. No. 4,184,189 teaches making a sensor with two metallized glass plates bonded together by a sealing glass mixture at about 500° C. The spacing between plates is achieved by shim stock.

U.S. Pat. No. 4,207,604 teaches making a sensor with a pair of insulating metallized plates sealed by melting glass frit. A metallized guard ring for the capacitor is used.

U.S. Pat. No. 4,345,299 teaches using two metallized ceramic substrates with an annular sealing ring to form a capacitive pressure transducer.

U.S. Pat. No. 4,177,496 teaches metallizing a pair of thin insulating plates (alumina quartz, pyrex) to form a capacitor. Glass frit or ceramic base material is fired to form a seal.

U.S. Pat. No. 4,261,086 teaches making a sensor by using a silicon wafer with etched cavities and anodically bonding it to a glass substrate. The capacitor electrodes are formed by metallizing the glass and highly doping the silicon cavity surface. Electrical connections are made through metallized holes in the glass.

U.S Pat. No. 4,386,453 teaches making a sensor by using a silicon wafer with etched cavities anodically bonded to a glass substrate. There is metallization of holes drilled in the glass. The metallized holes are used as electrical feedthroughs to make contact to capacitor plates.

Even though there are known capacitive-type pressure sensors, there continues to be a need to have a pressure sensor which can be produced with a fewer number of steps, which can be a smaller size, which has reduced unit cost, has improved accuracy and reliability, does not require temperature compensation of the signal and is not adversely effected by thermocycling. These are some of the problems this invention overcomes.

SUMMARY OF THE INVENTION

This invention includes a pressure transducer wherein a cavity is etched into a silicon wafer and then a silicon substrate is hermetically sealed to the silicon wafer using recrystallized silicon formed by thermomigration of liquid aluminum/silicon eutectic in silicon away from the interface between the silicon wafer and silicon substrate. A highly doped recrystallized p+ type path left behind in the lightly doped n− type silicon wafer by the migrating liquid eutectic can be used as an electrical conducting path to make contact to capacitor electrodes separated by the cavity. The capacitor electrodes themselves are highly doped p+ type regions, or metal coatings or other conductive coatings deposited on silicon.

In particular, the method of this invention includes forming a recess in at least one of two generally planar silicon wafers so that a cavity is formed at the interface between two silicon wafers when joined. A region of relatively high conductivity is formed in each wafer, a portion of the first region of high conductivity being on a first side of the cavity and a portion of a second region of high conductivity being on the second side of the cavity, opposite from the first side. A closed path of a first metal material is deposited at the interface between the two silicon wafers so that the cavity is within the enclosed path, the first metal material being adapted to be connected to the first region of high conductivity. A second metal material is deposited within the closed path, the second metal material being adapted to be connected to the second region of high conductivity. The two adjacent silicon wafers are exposed to a thermal gradient so that metal doped recrystallized silicon is formed at the location of the closed path at the interface between the silicon wafers thus hermetically sealing the cavity. The thermal gradient is such that the first and second metal materials form two high conductivity metal doped paths through the thickness of one of the silicon wafers thus providing a high conductivity path for each of the first and second high conductivity regions to an outside surface of one silicon wafer.

In comparison to the sensors taught in U.S. Pat. Nos. 4,261,086 and 4,386,453, an embodiment of this invention requires fewer processing steps to produce a sensor. Further, the sensors can be smaller so that a larger number of sensors can be built on a wafer and thus reduce unit cost. Also, no process changes are needed to scale the sensor for high pressure applications. This is in contrast to a sensor which requires the formation of a thin hole through thicker and thicker layers if it is to be used in a high pressure application. Because the sensor uses only silicon structural components, the sensor has improved accuracy and reliability. No temperature compensation of the signal of the absolute pressure sensor is necessary. During repeated thermal cycling there are no problems associated with peeling or flaking of metal electrodes or with leaks in the cavity developing due to stresses related to mismatch of thermal coefficients of expansion of different materials. Such a sensor can be used at high temperatures, up to about 600° C., where the intrinsic carrier concentration is still two orders of magnitude lower than the extrinsic concentration.

DESCRIPTION OF THE DRAWINGS

FIGS. 1A, 1B and 1C show components of a sensor in accordance with an embodiment of this invention before thermomigration including a plan view of the top silicon plate, a side section view of the top and bottom silicon plates and a plan view of the bottom silicon plate, respectively;

FIGS. 2A and 2B show a sensor in accordance with an embodiment of this invention after thermomigration including a plan view of the silicon sensor and a cross section view of a silicon sensor, respectively;

FIG. 7 is a cross section view, similar to the bottom substrate of Fig. 1B, of an alternative embodiment including a groove to receive a metal ring.

DETAILED DESCRIPTION OF THE INVENTION

Figure 3:
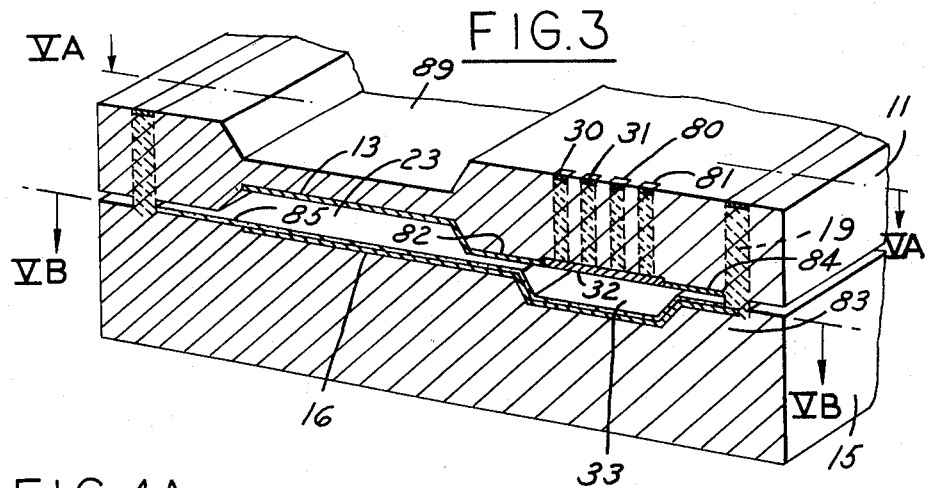
FIG. 3 shows a sensor in accordance with an embodiment of this invention in combination with an integrated circuit formed at the interface of the two silicon wafers forming the sensor and within the hermetic seal of the sensor.

Referring to FIG. 1A, a pressure sensor 10 includes a top silicon substrate wafer 11 with an etched cavity 12. In FIG. 1B, a highly doped p+ type region 13 forms the top electrode of a capacitor used as the pressure sensor. An aluminum dot 14 is formed on the p+ type region 13 to provide material used in thermomigration through silicon substrate wafer 11. Aluminum dot 14 is typically 50 microns in diameter and 2-3 microns thick. In FIG. 1C, a silicon substrate wafer 15 has formed on one side a highly doped p+ region 16 to form the bottom electrode of the capacitor used as the pressure sensor. An aluminum ring 17 is formed on wafer 15. Aluminum ring 17 is generally square in shape. After wafers 11 and 15 are aligned relative to one another as in FIG. 1B, they are brought closer together and the combined structure exposed to thermal gradient heating.

Electrode regions 13 and 16 can, if desired, be formed by deposition of thin metal films instead of by doping. Also, referring to FIG. 7, a substrate silicon wafer 15A may have a shallow square groove 70 etched into it such that a deposited aluminum ring 17A may extend approximately one micron above the surface. This will tend to prevent the sideways spreading of eutectic at the interface during initial melting, especially if pressure is used to hold the two wafers together.

FIGS. 2A and 2B show the thermomigration of the aluminum into the combined structure when heated. Migration of aluminum dot 14 leaves behind a highly conductive aluminum doped p+ type path 18 in wafer 11. A ring-like highly conductive aluminum doped path 19 is formed when aluminum ring 17 is migrated through wafer 11 under a thermal gradient. Recrystallized silicon having a highly doped p+ type conductivity is formed in place of aluminum ring 17 at the interface of wafers 11 and 15, thus bonding them together. The top of wafer 11 has formed thereon electrical contact pad 21 to contact p+ type conductivity region 19. Electrical contact pad 22 is formed on the top of wafer 11 to contact p+ type conductivity region 18. As a result of the thermomigration, the structure of FIG. 2B includes a cavity 23 formed between wafers 11 and 15.

During fabrication, the thermomigration of an aluminum-silicon eutectic liquid droplet occurs in the direction of the thermogradient in the silicon wafer. As the liquid eutectic droplet migrates toward a higher temperature region in the silicon, it leaves behind a highly doped recrystallized p+ path in the silicon. The capacitor plate on the cavity side and on the silicon substrate can be formed by highly doped p+ region (boron doped) or by metals or by conductive metal silicides that can withstand the thermomigration temperatures of approximately 1000°–1300° C. Aluminum ring 17 can be typically 10–200 microns wide and 2–5 microns thick and can be evaporated on a smooth polished silicon wafer 15. Aluminum ring 17 can be oriented in any direction on (111) wafers. In (100) wafers the preferred direction for the sides of aluminum ring 17 are (011) and (011). During fabrication, the two aligned silicon wafers 11 and 15 are held together by slight pressure and are placed in a thermogradient furnace, usually a vacuum furnace, although an inert gas such as argon can also be used. The thermogradient of order of 30°–100° C. per centimeter at 1000°–1300° C. is established perpendicular to the silicon wafers 11 and 15 and in such a way that the silicon with the aluminum ring is at a slightly lower temperature than the silicon piece with the cavity.

Figure 4A:
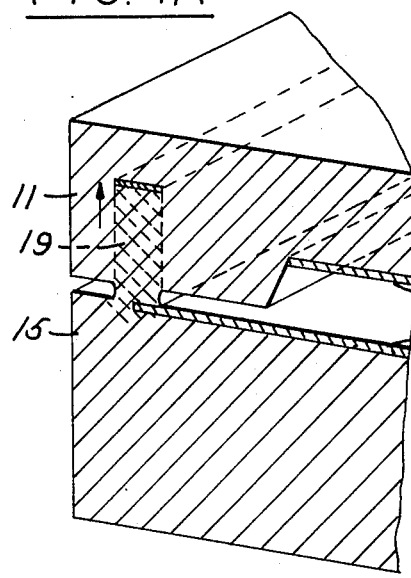
FIG. 4A shows the thermal migration of a eutectic region away from the interface between silicon wafers and FIG. 4B shows the completion of the thermomigration of the eutectic region to the surface of the silicon wafer and the formation of a heavily doped recrystallized silicon region at the interface between the two silicon wafers.
Figure 4B:
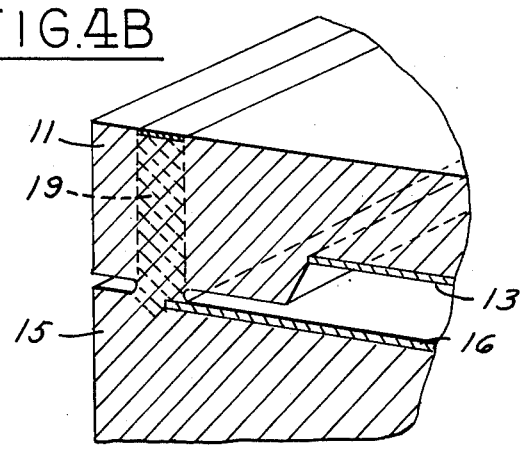

The aluminum and silicon will form a eutectic with melting point of 577° C. The two silicon wafers are held at a temperature (1000°–1300° C.) until the liquid eutectic droplet has migrated through the silicon piece with the cavity. The direction of thermogradient in silicon is important because the liquid eutectic droplet migrates along the gradient. The migration is shown in FIG. 4A and the final position of the liquid droplet is shown in FIG. 4B. That is, the liquid eutectic drop starts to migrate at the interface of the two silicon wafers, leaving behind a recrystallized silicon region which bonds the two silicon pieces together. If desired, the remaining aluminum material at the surface can be removed, for instance by using an etchant ($H_3PO_4$, $HNO_3$, $CH_3COOH$, $H_2O$; 16:1:1:2).

The recrystallized region is highly doped with aluminum atoms which act as acceptors in silicon forming a highly p+ region. These p+ regions can act as electrical feedthroughs in n— type silicon and thus can be used to make contact to the capacitor electrodes. The bottom capacitor plate on the silicon substrate can make contact to the square aluminum silicon eutectic ring that is migrated through the silicon wafer having the cavity. Contact to electrode in the cavity can be made by migrating an aluminum silicon droplet through the silicon wafer at the same time as the two silicon pieces are bonded.

When the silicon wafers are joined by silicon, no thermal stresses are present due to mismatch of thermal coefficients of expansion, as would occur if silicon were bonded to glass substrates or the two silicon wafers were joined by an intermediary material. Since the structure is used as a sensor, temperature compensation is simplified. The process described above can be done in a batch so that a relatively large number of sensors on a wafer can be hermetically sealed at the same time. A typical process time is about three to five minutes at about 1300° C.

More particularly, typical processing steps can include:
1. Clean Si wafer
2. Oxidize Si wafer (dry/wet/dry)
3. RCA clean
4. Photoresist/bake/expose/develop
5. Etch SiO₂ at cavity locations
6. Strip photoresist
7. RCA clean
8. Etch cavities into Si wafer
9. Etch SiO₂ from rest of wafer
10. RCA clean
11. Mask wafer except at cavity locations
12. Surface dope only cavity areas with boron (p+)
13. Vapor deposit aluminum dots, approximately 50 microns in diameter, at center of cavities
14. Surface dope all of Si wafer with boron
15. Vapor deposit aluminum
16. Resist coat/bake/expose/develop
17. Etch aluminum
18. Strip resist
19. Thermomigrate aluminum patterns on silicon wafers forming hermetic seals and feedthroughs at the same time.
20. Tape, mount and saw wafer into individual sensors.

Referring to FIG. 3, if desired, additional feedthroughs 80, 81, 30 and 31 can be made through silicon wafer 11 to contact an integrated circuit 32 formed on an inside surface of wafer 11 and opposite a cavity 33 formed in wafer 15. Wafer 15 is much thicker than a diaphragm 89 in wafer 11 such that the deflection of wafer 15 under applied pressure can be neglected. The thickness of wafer 11 at location of circuit 32 is also thick so that there is negligible deflection of wafer 11 at the circuit location. Advantageously, integrated circuit 32 is adapted to process a signal associated with the pressure sensor. Cavity 33 aligns with integrated circuit 32. As a result, integrated circuit 32 is also within the hermetic seal provided by recrystallized silicon at the location of ring 17, path 19. High conductivity feedthroughs 80, 81, 30 and 31, in addition to being connected to integrated circuit 32, can each be connected to one plate of the capacitor formed by the doped regions on either side of cavity 23. In FIG. 3, the upper plate 13 is coupled by a high conductivity path 82 to the region of the integrated circuit and feedthroughs 80, 81, 30 and 31. The lower plate 16 is connected through a high conductivity path 83 to ring 17 and then by a high conductivity path 84 from ring 17 to integrated circuit 32. A silicon passivation layer 85 can be formed on top of lower plate 16 of the capacitor and high conductivity path 83 to prevent shorting of the capacitor plates when the plates are pushed towards one another and may touch at high pressures. Cavities 23 and 33 are connected and each are under vacuum when the apparatus is used as an absolute pressure sensor. Thus, cavities 23 and 33 are sealed from the environment by the recrystallized silicon left behind by thermomigration of the eutectic ring through a silicon wafer.

Figure 5A:
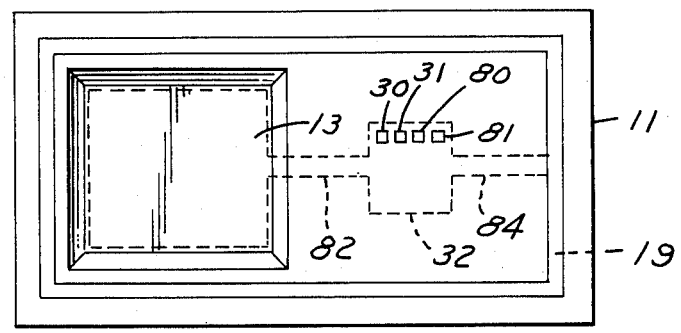
FIGS. 5A and 5B are plan views of the surface, at the interface, of the top and bottom silicon substrates, respectively, of the embodiment of FIG. 3.
Figure 5B:
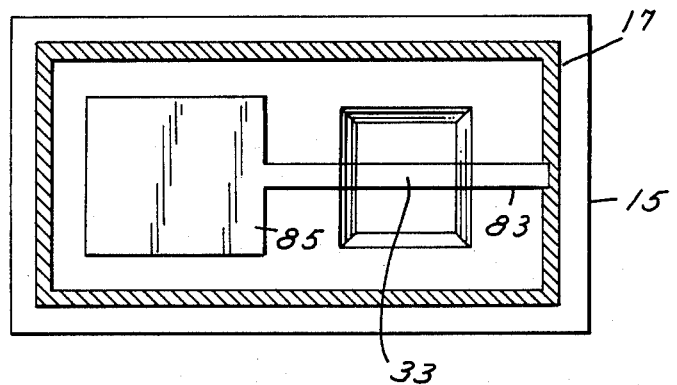

Referring to FIGS. 5A and 5B, the bottom plan view of silicon wafer 11 and the top plan view of silicon wafer 15 are shown. In FIG. 5A, the upper electrode 13 is shown connected to an integrated circuit 32 by a high conductivity path 82. A high conductivity path 84 connects integrated circuit 32 to path 19 formed by ring 17. In FIG. 5B, the lower plate is connected by a high conductivity path 83 to ring 17 across the indentation forming a cavity 33. Formed on top of silicon wafer 15 within the boundary of ring 17 is the passivation layer 85.

Figure 6:
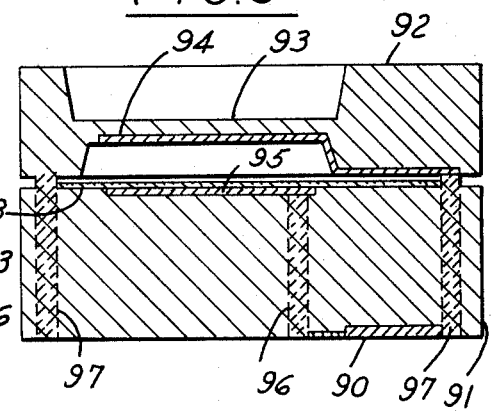
FIG. 6 is a cross section view, similar to FIG. 3, of an alternative embodiment combining a pressure sensor and an integrated circuit.

Referring to FIG. 6, a variation of the pressure sensor including an integrated circuit of FIG. 3 has an electronic circuit 90 on the bottom exterior portion of a silicon wafer 91. A silicon wafer 92 has a thinner diaphragm portion 93, the interior portion of which has a highly doped p+ type conductivity plate 94. The portion of wafer 91 opposite diaphragm 93 has a highly doped capacitive plate 95. A feedthrough of highly doped material 96 couples highly conductive plate 95 to the exterior of wafer 91. An aluminum ring feedthrough 97 couples conductive plate 93 to the exterior of wafer 91. A silicon dioxide passivation layer 98 is formed on top of conductive area 95 so that if diaphragm 93 deflects to the point where conductive regions 95 and 94 would contact they are insulated from one another by passivation layer 98.

Gold can be used instead of aluminum to form a eutectic with silicon. The gold atoms also act as a dopant in silicon so the paths left behind by the migrating liquid eutectic can be used as electrical feedthroughs.

Various modifications and variations will no doubt occur to those skilled in the arts to which this invention pertains. For example, the particular shape of the cavity for the pressure sensor may be varied from that disclosed herein. These and all other variations which basically rely on the teachings through which this disclosure has advanced the art are properly considered within the scope of this invention.

I claim:
1. A method for fabricating a pressure sensor including the steps of:
forming a recess in at least one of two generally planar silicon wafers so that a cavity is formed at the interface between the two silicon wafers when joined;
forming a region of relatively high conductivity in each of the silicon wafers, a portion of a first region of high conductivity being on a first side of the cavity and a portion of a second region of high conductivity being on a second side of the cavity, opposite from the first side;
depositing a closed path of a first metal material at the interface between the two silicon wafers so that the cavity is within the closed path, the first metal material being adapted to be connected to the first region of high conductivity;
depositing a second metal material within the closed path, the second metal material being adapted to be connected to the second region of high conductivity; and
exposing the adjacent two silicon wafers to a thermal gradient so that a metal doped recrystallized silicon is formed at the location of the closed path at the interface between the silicon wafers thus hermetically sealing the cavity, the thermal gradient being such that the first and second metal materials form a high conductivity metal doped path through the thickness of one of the silicon wafers thus providing a high conductivity path for each of the first and second high conductivity regions to an outside surface of one silicon wafer.

2. A method for fabricating a pressure sensor as recited in claim 1 further comprising the step of:
forming a recessed groove in one of the two silicon wafers, at the interface between the two silicon wafers, in the shape of the closed path of the first metal material so that at least a portion of the first metal material can be deposited in the recessed groove below the top of the groove.

3. A method for fabricating a pressure sensor as recited in claim 1 wherein said steps of:
depositing a first and a second metal material uses gold material; and
forming a region of relatively high conductivity in each of the silicon wafers includes applying p-type doping in the silicon wafers.

4. A method for fabricating a pressure sensor as recited in claim 1 further comprising the step of:
forming a passivating layer on at least one of the first and second regions of high conductivity so as to prevent electrical contact between the first and second regions of high conductivity as pressure forces them together.

5. A method for fabricating a pressure sensor as recited in claim 1 wherein said steps of:
depositing a first metal material uses a first aluminum material, and
forming a region of relatively high conductivity in each of the silicon wafers includes applying p-type doping to the silicon wafers.

6. A method for fabricating a pressure sensor as recited in claim 5 wherein the step of:
depositing the second metal material uses a second aluminum material located on and registered with the second region of high conductivity.

7. A method for fabricating a pressure sensor as recited in claim 5 wherein the step of:
depositing the second metal material uses a second aluminum material deposited at a location spaced from the cavity; and further comprising the step of:
forming a high conductivity path between the second region of high conductivity in the cavity and the second aluminum material.

8. A method for fabricating a pressure sensor as recited in claim 7 further comprising the step of:
placing a third aluminum material within the closed path and spaced from the cavity so as to form a third high conductivity eutectic path through a silicon wafer during exposure of the two silicon wafers to the thermal gradient; and
forming an integrated circuit signal processing means, for processing a signal associated with the pressure sensor, on the silicon wafer, the integrated circuit being coupled to the high conductivity eutectic paths associated with the second and third aluminum materials.

9. A method for fabricating a pressure sensor including the steps of:
forming a recess in a first generally planar silicon wafer so that a cavity is formed at the interface when the first silicon wafer is joined to a second generally planar silicon wafer;
forming a first region of p− type conductivity in the recess of the first silicon wafer;
forming a second region of p− type conductivity in the surface of the second silicon wafer at a location aligned with the cavity;
forming an insulating passivating layer on the second region of p− type conductivity;
depositing a closed path of aluminum at the interface between the first and second silicon wafers and around the cavity;
depositing a first aluminum material at the interface between the first and second silicon wafers, inside the closed path and spaced from the cavity;
depositing a second aluminum material at the interface between the first and second silicon wafers, inside the closed path and spaced from the cavity;
forming a high conductivity connection between the first aluminum material and the first region of p− type conductivity;
forming a high conductivity connection between the second aluminum material and the second region of p− type conductivity;
forming an integrated circuit means for signal processing on the first silicon wafer to contact the first and second aluminum material; and
exposing the first and second silicon wafers to a thermal gradient so that aluminum doped recrystallized silicon is formed at the location of the closed path at the interface between the first and second silicon wafers thus hermetically sealing the cavity, the thermal gradient being such that the first and second aluminum materials each form a high conductivity aluminum doped path through the thickness of the first silicon wafer with an eutectic material of aluminum and silicon at the surface of the first silicon wafer, thus providing electrical connection from the outside to the integrated circuit means.

10. A method for fabricating a pressure sensor as recited in claim 9 further including the step of:
removing the eutectic material at the surface of the first silicon wafer.

11. A method for fabricating a pressure sensor including the steps of:
forming a first and a second silicon wafer;
etching a cavity into the first silicon wafer;
doping the bottom of the cavity to form a highly doped p+ type region;
doping one side of said second wafer to form a highly doped p+ type region;
depositing a first aluminum material around the periphery of the region outlined by said cavity;
depositing a second aluminum material within the ring formed by said first aluminum material;
positioning said first and second wafers so that said two p+ type regions oppose each other; and
heating the combined structures using a thermal gradient so that an aluminum silicon eutectic migrates through said first silicon wafer.

12. A capacitor pressure sensor including:
a first and second silicon wafer having therebetween a cavity with a surrounding hermetic seal and opposing cavity plates;
a first conductive aluminum doped p+ type path through said first wafer to said cavity;
a second conductive aluminum doped p+ type path through said first wafer to a boundary portion of said cavity;
said hermetic seal of said cavity between said first and second wafers being recrystallized silicon highly doped with p+ type impurities; and
said opposing cavity plates of said cavity in said first and second silicon wafers being doped regions with p+ type impurities to form electrodes of a capacitor.

13. A capacitor pressure sensor as recited in claim 12 further comprising:
an integrated circuit formed on the outside surface of said first wafer, opposite from the interface between said first and second silicon wafers, and electrically coupled to said first and second conductive paths.

14. A capacitor pressure sensor including:
a first silicon wafer with a recess having a p− type doped surface;
a second silicon wafer having a p− type doped surface region aligned with said recess and hermetically sealed to said first silicon wafer by a closed path around said recess of an aluminum doped recrystallized silicon seal;
a first aluminum doped p− type conductive silicon path extending through said first silicon wafer and located within said closed path; and
a second aluminum doped p− type conductive silicon path extending through said first silicon wafer and aligned with said closed path.

15. A capacitor pressure sensor means as recited in claim 14 wherein said first conductive path is aligned with said recess.

16. A capacitor pressure sensor as recited in claim 14 further comprising:
an insulating passivating layer formed on said p− type doped surface region of said second silicon wafer;
an integrated circuit formed on said first silicon wafer at the interface of said first and second silicon wafers and within said closed path; and
a third aluminum doped p− type conductive path extending through said first silicon wafer to said integrated circuit, and wherein
said first conductive path is aligned with said integrated circuit.

17. A capacitor pressure sensor as recited in claim 16 further comprising:
a recess in said second silicon wafer aligned with said integrated circuit on said first silicon wafer.

* * * * *